US006632062B2

(12) United States Patent
Matz et al.

(10) Patent No.: US 6,632,062 B2
(45) Date of Patent: Oct. 14, 2003

(54) PARTS HANDLING DEVICE FOR PRESS

(75) Inventors: Anthony Matz, Highland Park, IL (US); Jianlai Qin, Skokie, IL (US)

(73) Assignee: Tempel Steel Company, Chicago, IL (US)

(*) Notice: Subject to any disclaimer, the term of this patent is extended or adjusted under 35 U.S.C. 154(b) by 132 days.

(21) Appl. No.: 09/982,737

(22) Filed: Oct. 18, 2001

(65) Prior Publication Data

US 2002/0061242 A1 May 23, 2002

Related U.S. Application Data

(62) Division of application No. 09/593,052, filed on Jun. 13, 2000.

(51) Int. Cl.[7] ................................ B65G 57/00

(52) U.S. Cl. .................. 414/27; 414/908; 193/35 A; 193/35 R

(58) Field of Search ................. 414/27, 908; 198/523, 198/530; 193/35 A, 35 R

(56) References Cited

U.S. PATENT DOCUMENTS 2,606,671 A * 8/1952 Bates .......................... 294/97
2,624,880 A * 1/1953 Lind et al. .................. 221/299
3,107,015 A * 10/1963 Hasell ........................ 198/416
3,144,169 A * 8/1964 Boyd ......................... 198/408
3,195,444 A * 7/1965 McLean ........................ 100/1
3,240,356 A * 3/1966 Hill ........................... 198/418
3,247,952 A * 4/1966 Kozlosky .................... 198/360
3,572,522 A * 3/1971 Nesterok .................... 221/105
3,704,780 A * 12/1972 Aidlin et al. ............... 198/523
3,796,324 A * 3/1974 Schmitz ...................... 221/298
3,875,659 A * 4/1975 Burkin et al. .............. 29/240.5
3,946,884 A * 3/1976 Kato et al. .................. 198/418
4,030,619 A * 6/1977 Hiscoe ........................ 221/93
4,250,614 A * 2/1981 Schwab ....................... 29/732
4,274,782 A * 6/1981 de Rancourt de Mimerand et al. ......................... 211/59.1
4,306,826 A * 12/1981 Detwiler ..................... 118/320
4,383,356 A * 5/1983 Fichtner ................. 219/137 R
4,494,900 A * 1/1985 Johnson et al. ............... 193/47
4,507,038 A * 3/1985 Lequeux ...................... 414/27
4,572,066 A * 2/1986 Raveggi ..................... 100/295
4,589,811 A * 5/1986 Riccardo et al. .......... 193/35 R
4,642,013 A * 2/1987 Mundus et al. .......... 198/468.8

(List continued on next page.)

FOREIGN PATENT DOCUMENTS

CH 347408 * 8/1960 .................. 414/27
DE 2556021 A1 * 6/1977 .................. 414/27

OTHER PUBLICATIONS

Western Electric Technical Digest, No. 58, Apr. 1980, "Blanking Stacker", T.A. Aycock.*

*Primary Examiner*—Donald P. Walsh
*Assistant Examiner*—Jeffrey A Shapiro
(74) *Attorney, Agent, or Firm*—Schiff Hardin & Waite

(57) ABSTRACT

In a parts handling device and method for handling parts having a central aperture output from a press, the curved slide is provided extending in sloping fashion with its upper end being positioned at the press and its lower end at a location for unloading accumulated parts. A frame is provided for mounting first, second and third clamp assemblies along the curve slide. First, second and third mounting elements are provided beneath the curve surface of the slide in space relationship from one another in alignment with the clamp assemblies. When only two of the clamp assemblies are closed, the tube is rigidly held in its slope position. The control system is provided for selectably opening and closing the first, second and third clamp assemblies in a sequence which permits the parts which are accumulating in front of the first or second clamp assemblies to pass through to the third clamp assembly and eventually to an off-loading station when the third clamp assembly is open.

14 Claims, 6 Drawing Sheets

U.S. PATENT DOCUMENTS

| | | | | | |
|---|---|---|---|---|---|
| 4,710,085 | A | * | 12/1987 | Beakes et al. | 221/297 |
| 4,729,709 | A | * | 3/1988 | Raasch | 198/430 |
| 4,735,540 | A | * | 4/1988 | Allen et al. | 118/503 |
| 4,783,021 | A | * | 11/1988 | Nagasawa | 198/487.1 |
| 4,796,499 | A | * | 1/1989 | Achelpohl | 414/27 |
| 4,865,509 | A | * | 9/1989 | Carlton | 198/468.1 |
| 4,890,975 | A | * | 1/1990 | Hoff et al. | 414/27 |
| 4,992,016 | A | * | 2/1991 | Ferloni | 414/27 |
| 4,998,987 | A | * | 3/1991 | Jacobs | 209/552 |
| 5,076,754 | A | * | 12/1991 | Ebmeyer et al. | 271/168 |
| 5,096,357 | A | * | 3/1992 | Galbani | 198/487.1 |
| 5,121,680 | A | * | 6/1992 | Nordberg | 100/12 |
| 5,169,271 | A | * | 12/1992 | Yamashita | 294/81.52 |
| 5,287,895 | A | * | 2/1994 | Raaijmakers et al. | 104/91 |
| 5,340,260 | A | * | 8/1994 | Turra et al. | 414/27 |
| 5,460,477 | A | * | 10/1995 | Macchiarulo et al. | 156/137 |
| 6,511,276 | B1 | * | 1/2003 | Matz et al. | 414/27 |

* cited by examiner

PARTS HANDLING DEVICE FOR PRESS

The present application is a divisional application of parent application Ser. No. 09/593,052 entitled "PARTS HANDLING DEVICE FOR PRESS", filed Jun. 13, 2000.

BACKGROUND OF THE INVENTION

High speed metal stamping presses are known which output many hundreds or thousands of pieces per hour which are stamped out from metal sheet stock being fed to the press, typically by an automatic coil feed system. Scrap material is then ejected from the press along with the stamped out parts.

More particularly, in the field of motor rotor and stator lamination stamping, it is known to employ progressive dies for stamping out motor laminations for rotors and stators. These motor laminations are typically formed roughly in the form of a circle or polygon with the stator lamination being larger than the rotor lamination for matching parts since the rotor fits within the inner aperture of the stator. The rotor also has an inner aperture.

In high speed lamination presses, it has previously been known to remove the stamped out parts in a manual manner wherein the parts fall through the bottom of the die and through a hole in the bolster plate beneath the die where they are accumulated in a stack. The bolster plate has a lower cutout portion where the stacked laminations can be removed such as by use of a simple metal hook manually operated to pull the stacks away from beneath the bolster plate, or by using a parts conveyor. The stacks are thereafter manually placed on a stacking skid by the person or persons employed in the removal and stacking of the laminations. If a desired number of laminations per stack is required, then the operator must manually measure the stack of laminations prior to placing the stacks on the shipping skid. A proper stack of laminations can be created by the press stroke counter.

A number of techniques have been developed to automate the manual method. In one such technique in the prior art, instead of the punched out laminations exiting vertically from the die they are carried through horizontally onto an output conveyor. Thereafter, a magnetic conveyor arranged overhead to the output conveyor conveys the laminations to a station which has a temporary parts accumulator above a mandrel. The laminations are accumulated on the mandrel such that a bottom plate of the mandrel lies between a conveyor formed of two parallel segments. As the mandrel and bottom plate are moved downwardly, the stacks come to rest on the parallel conveyor segments and can be conveyed away. While this is occurring, the temporary parts accumulator positioned directly beneath the magnetic conveyor formed by a stopper above the mandrel accumulates the parts until the mandrel can be repositioned to accumulate another group of parts.

Other even more complicated systems are employed in the prior art involving multiple conveyors and mandrels located on the turn table and temporary parts accumulation stations.

With such prior art methods, there are at least the following disadvantages:

1. They are expensive to manufacture;
2. They are slow;
3. Multiple conveyors are required;
4. Frequent jam-ups occur;
5. It is difficult for the operator to constantly check quality of the parts being removed from the press and stacked.

SUMMARY OF THE INVENTION

It is an object of the present invention to provide for an automatic parts handling system and method which is sufficiently fast and jam-up free so as to allow a substantial increase of the press speed, such as a doubling of the press speed.

It is a further object of the invention to provide ease of inspection of the parts so that it is easy to see bad parts before too many of them have accumulated in the stack.

It is a further object of the invention to have a system which can be easily modified to accommodate a variety of different inside and outside diameters of parts such as motor stators and motor rotors.

It is a further object of the invention to provide a system which is mobile.

It is another object of the invention to reduce the expense of manufacture.

It is a further object of the invention to provide a more reliable parts handling system which eliminates or greatly reduces jam-ups which can occur.

It is another object of the invention to provide a system which can be easily changed to accommodate either a stator or a rotor of a matching lamination set.

According to the method and apparatus of the invention, the parts handling device is provided for handling parts having a central aperture output from a press. A curved slide extends in sloping fashion with its upper end being positioned at the end of the parts conveyor press and its lower end at a location for unloading accumulated parts. A frame is provided having first, second, and third clamp assemblies mounted thereon. The support the tube, first, second and third clamping rings are provided beneath the curved surface of the slide at a spaced relationship from one another and in alignment with the clamp assemblies. The clamp assemblies clamp onto the first, second and third clamping rings. When at least two of the clamp assemblies are closed, the tube is fully supported in its sloped position. A control system is provided for opening and closing the first, second and third clamp assemblies in a sequence permitting the parts to accumulate in front of either the first, second or third clamping assemblies.

In a method of operation of the system, in a first step the first clamp mechanism is opened and the second and third clamp assemblies are closed so that parts accumulate in a stack in front of the second clamp assembly. In a second step, the first and third clamp assemblies are closed and the second clamp assembly is opened so that the stack now moves by gravity in front of the third clamp assembly. In a third step, the first and second clamp assemblies are closed and the third clamp assembly is opened so that the stack now moves to a position after the third clamp assembly where the operator can remove the stack. In a fourth step, the first clamp assembly is opened and the second and third clamp assemblies are closed which is the same operating condition as step 1. In a fifth step, the operator unloads the stack at the end of the tube while parts are again accumulating in front of the second clamp assembly.

DESCRIPTION OF THE PREFERRED EMBODIMENTS

Figure 1:
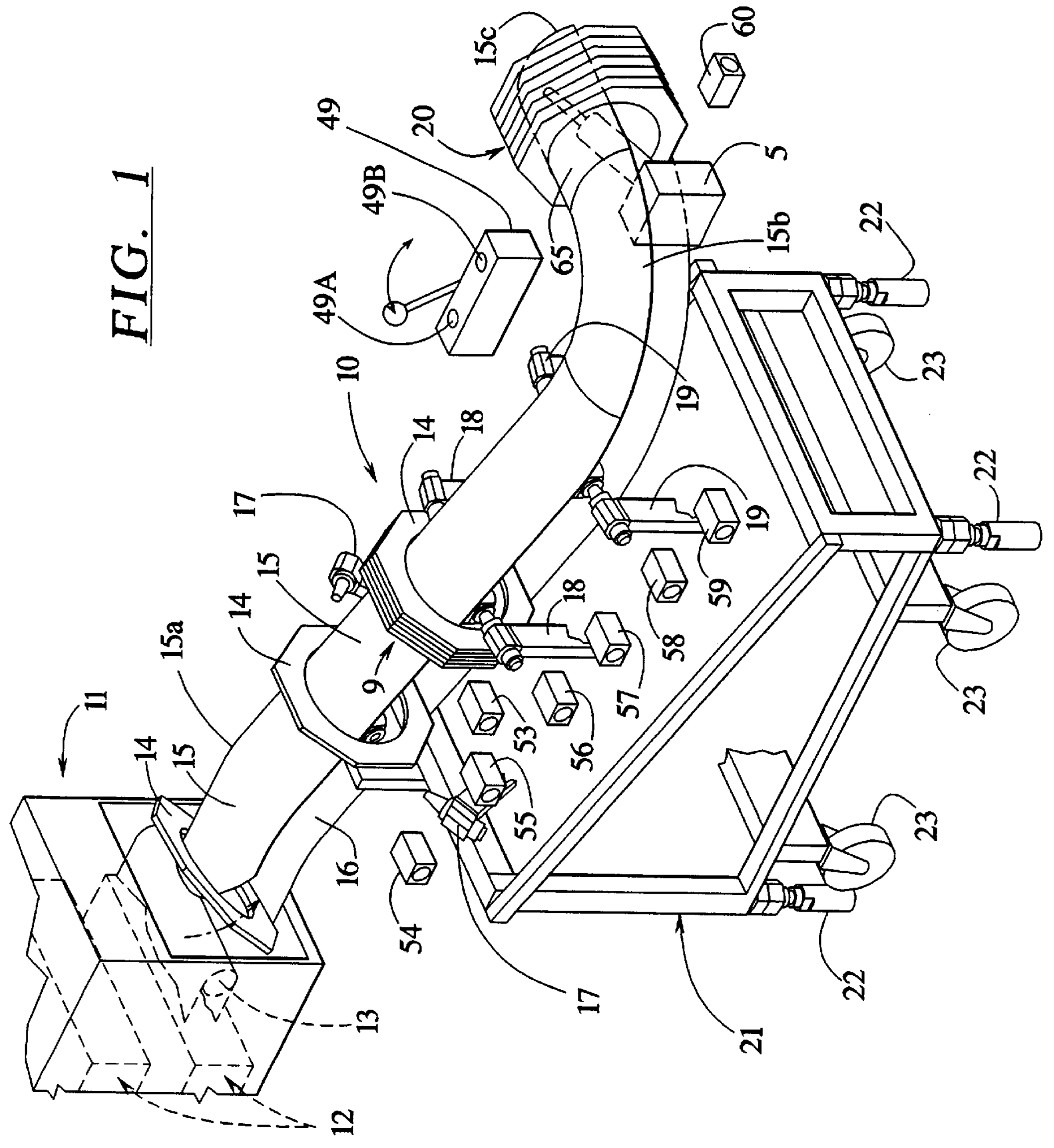
FIG. 1 is a perspective view of the parts handling device of the present invention receiving stator parts from a motor lamination die in a high speed press.

The automatic parts handling device according to the invention is shown in FIG. 1 generally at 10. The device operates in conjunction with a high speed automatic press 11 such as a lamination press for manufacturing motor rotors and/or stators. The press 11 contains typically a progressive die 12 having an output conveyor surface 13 from which motor stators 14, for example, are fed out at high speed.

The motor stators 14 are slid over and onto the conveying slide or tube 15 at a bent down leading end portion 15*a* of the slide with the leading end portion 15*a* entering into an aperture in the middle of the stators. They rotate downwardly in a flipping motion as shown by the arrow when they are released from the conveyor surface 13 until the bottom edge of the stators 14 contact against an alignment slide plate 16. As the stators 14 continue down the slide, they pass the open first clamp assembly 17 and come to rest in front of the closed second clamp assembly 18 where they are stacked as illustrated by stack 9. If clamp assembly 18 is opened, then the stator stack 9 slides along the tube or slide 15 until it reaches the closed third clamp assembly 19. If the clamp assembly 19 is then opened, then the stator stack continues to slide along the tube or slide 15 and around a curved portion 15*b* where it comes to rest as shown by stack 20 where it is removed manually by the operator.

The conveying or slide tube 15 and the first, second and third clamp assemblies 17, 18 and 19 are mounted to a frame 21 which has screwed down legs 22 for stability and caster jacks 23 for portability.

It is important to note that the conveying or slide tube 15 is held in position when any two of the three clamp assemblies are closed. If the slide is to be removed and interchanged with a different size slide such as for different size stators or rotors, then all three clamp assemblies would be opened and the tube can then be freely removed and interchanged with a new tube of different dimensions.

Figures 2, 3A, 3B:
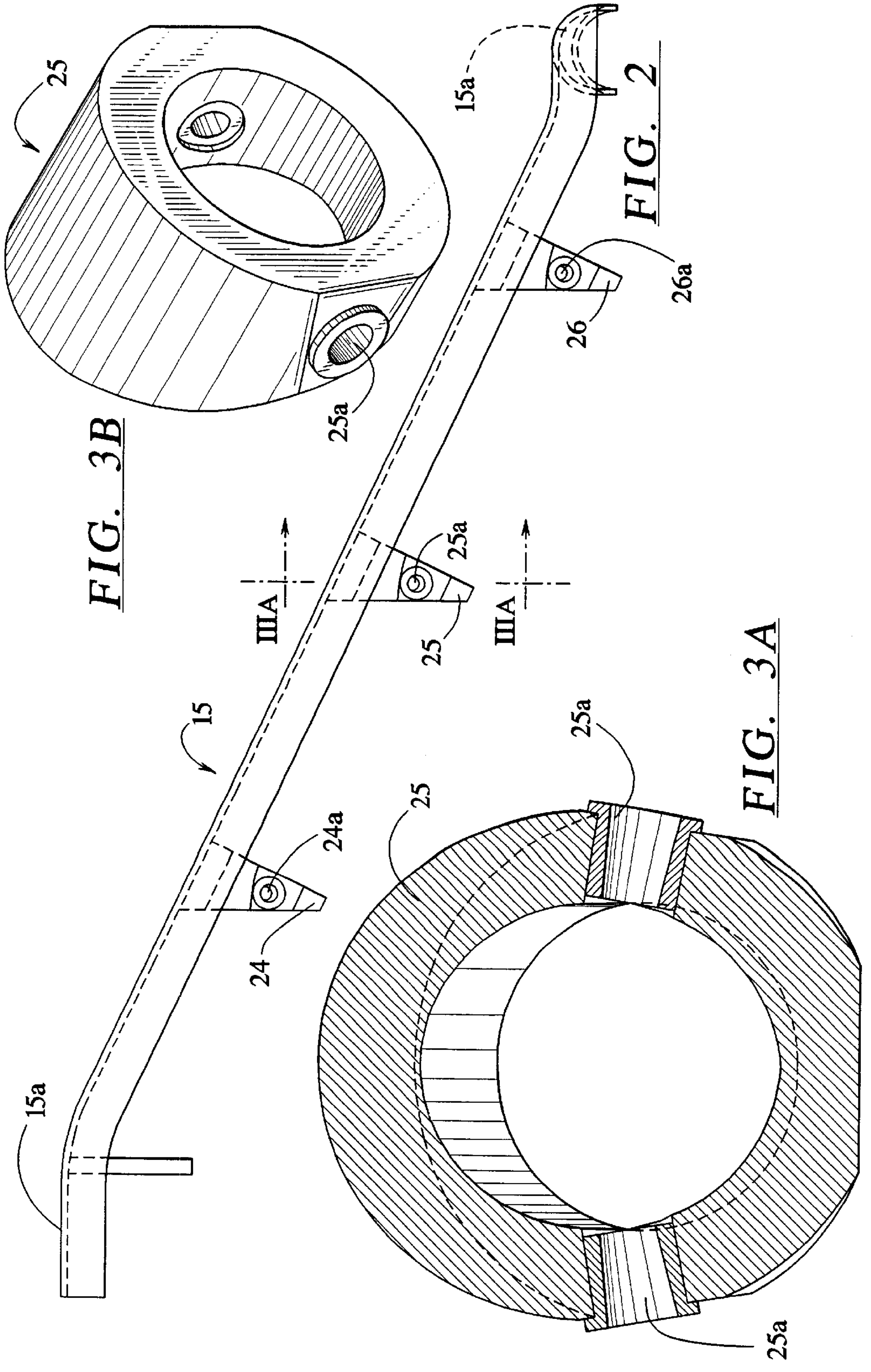
FIG. 2 is a side view of the conveying tube or slide employed in the device of FIG. 1.
FIG. 3A is a sectional view along line IIIA—IIIA of a clamping ring in FIG. 2 of the conveying tube or slide.
FIG. 3B is a perspective view of the clamping ring of FIG. 3B.

Referring to FIG. 2, it can be seen that the slide or tube 15 has first, second and third clamping rings 24, 25 and 26 attached at the undersurface thereof. These rings can also be clearly seen in FIG. 3A and FIG. 3B. Each of these clamping rings has a pressed-in bushing 24*a*, 25*a* and 26*a* with apertures on opposite sides of the respective rings.

Figure 4A:
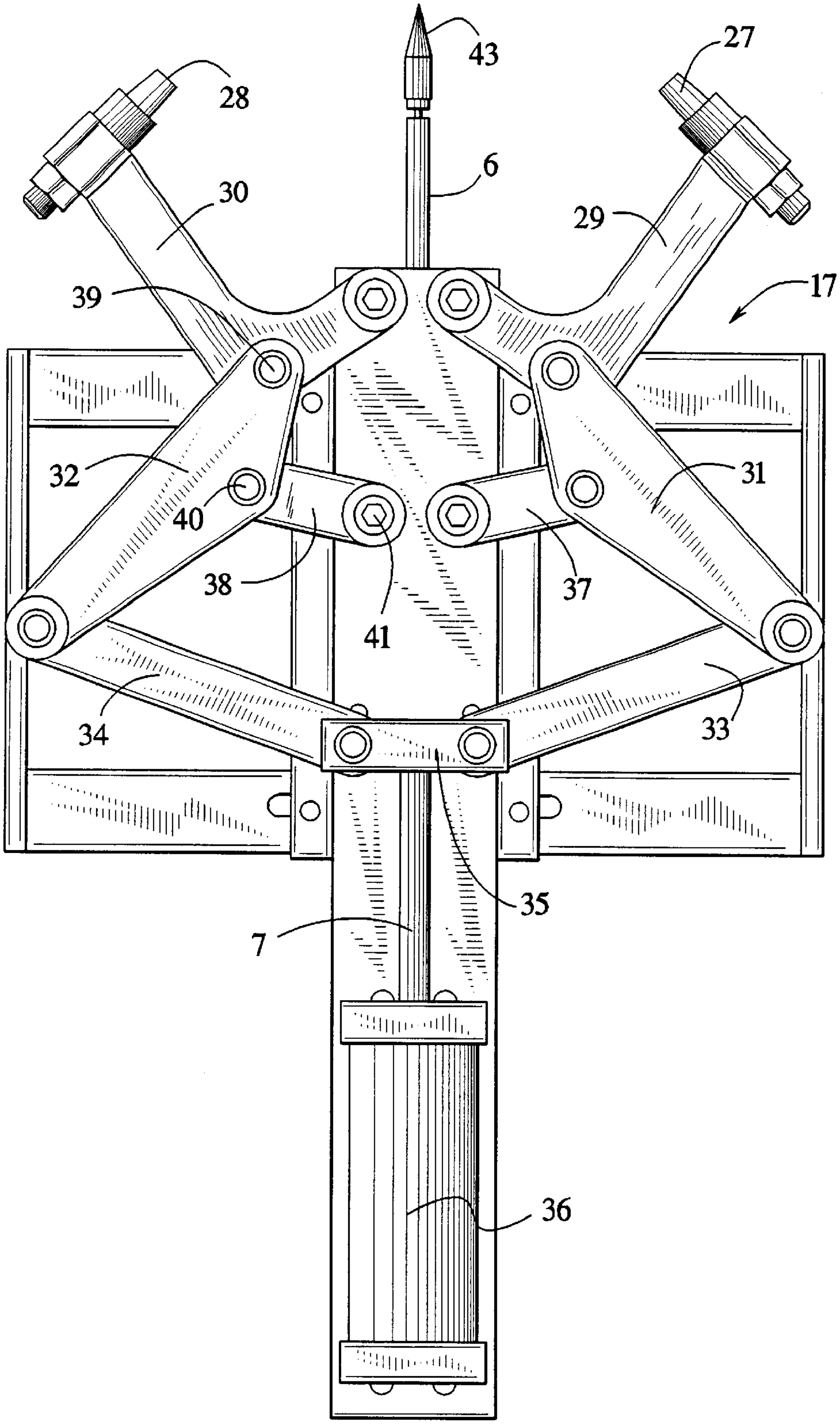
FIG. 4A is an end view of one of the clamp assemblies employed in the device of FIG. 1 in an open position.

Referring to FIG. 4A, a detail of the first clamp assembly 17 is illustrated in the open position. The clamp assembly has first and second clamp support pins 27 and 28 which are received in apertures in the respective pressed in bushings 24*a* in clamping ring 24, for example. These support pins 27 and 28 are mounted to respective clamping arms 29 and 30. The clamping arms 29 and 30 are pivotably connected to intermediate links 31 and 32 which in turn are connected to drive links 33 and 34. The drive links 33 and 34 are driven by horizontal link 35 via piston 25 of a cylinder 36. Pivot links 37 and 38 are also provided.

Figure 4B:
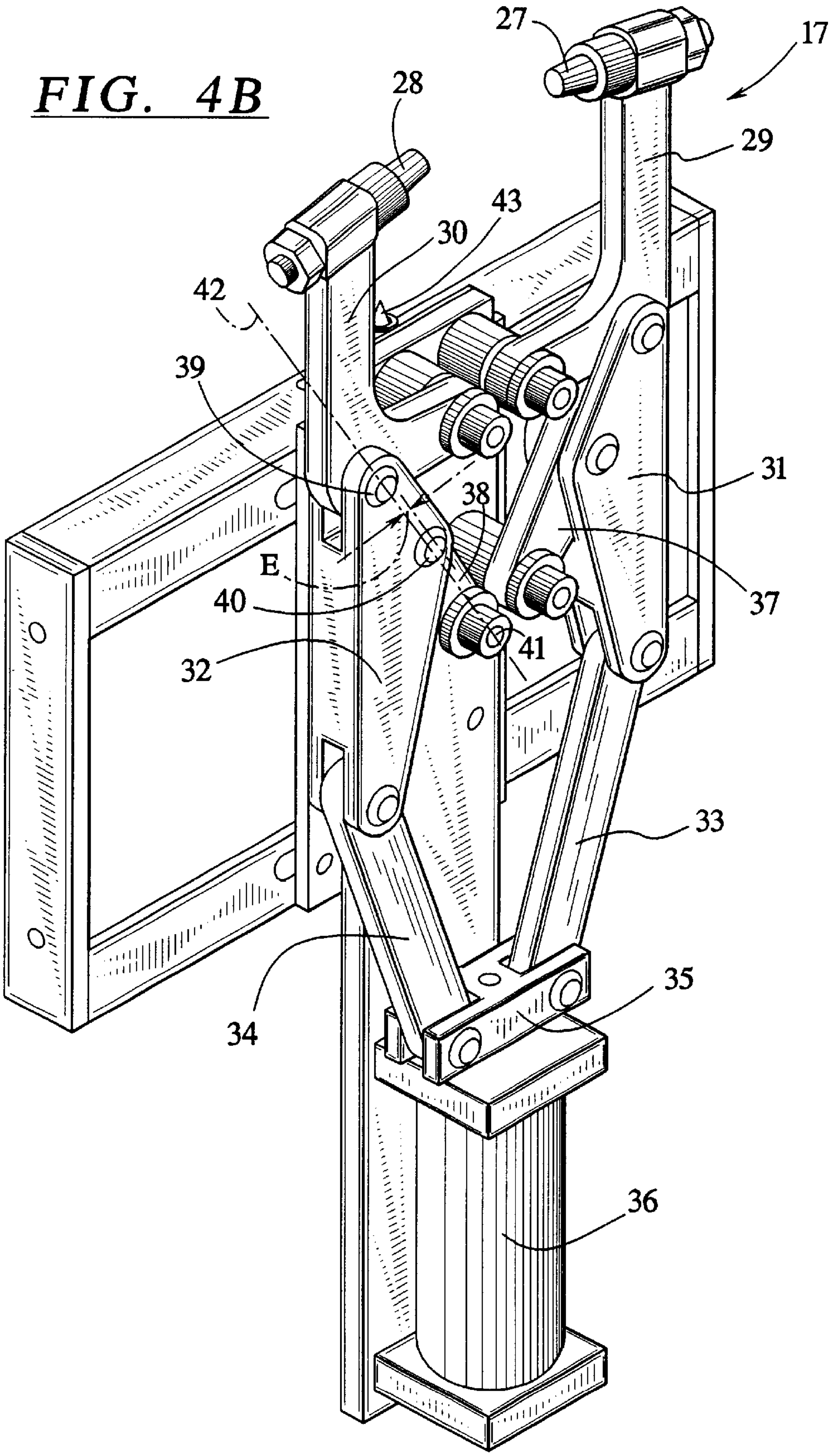
FIG. 4B is a perspective view of the FIG. 4A clamp assembly, but in the closed position.

What is interesting to note, is that in the clamp assembly 17 when in the closed position as shown in FIG. 4B, the pivot members 39 and 41 define a line 42 wherein the pivot member 40 lies slightly inwardly of said line—see offset E. This has the effect that when in the clamped position shown in FIG. 4B, the clamp assembly is self-locked and a bias force is required in order to open the clamp assembly. This feature is to assure safety in case of air line fatigue.

Element 6 is a reciprocating stop member which moves up and down so as to move the point member 43 into a position for preventing a part from getting caught between the arms of the first clamping assembly and is actuated by a valve not shown prior to when the first clamping assembly 17 is actuated. Reciprocating element 6 may be moved upwardly and downwardly in any well-known mechanism such as by a cylinder not shown.

Figure 5:
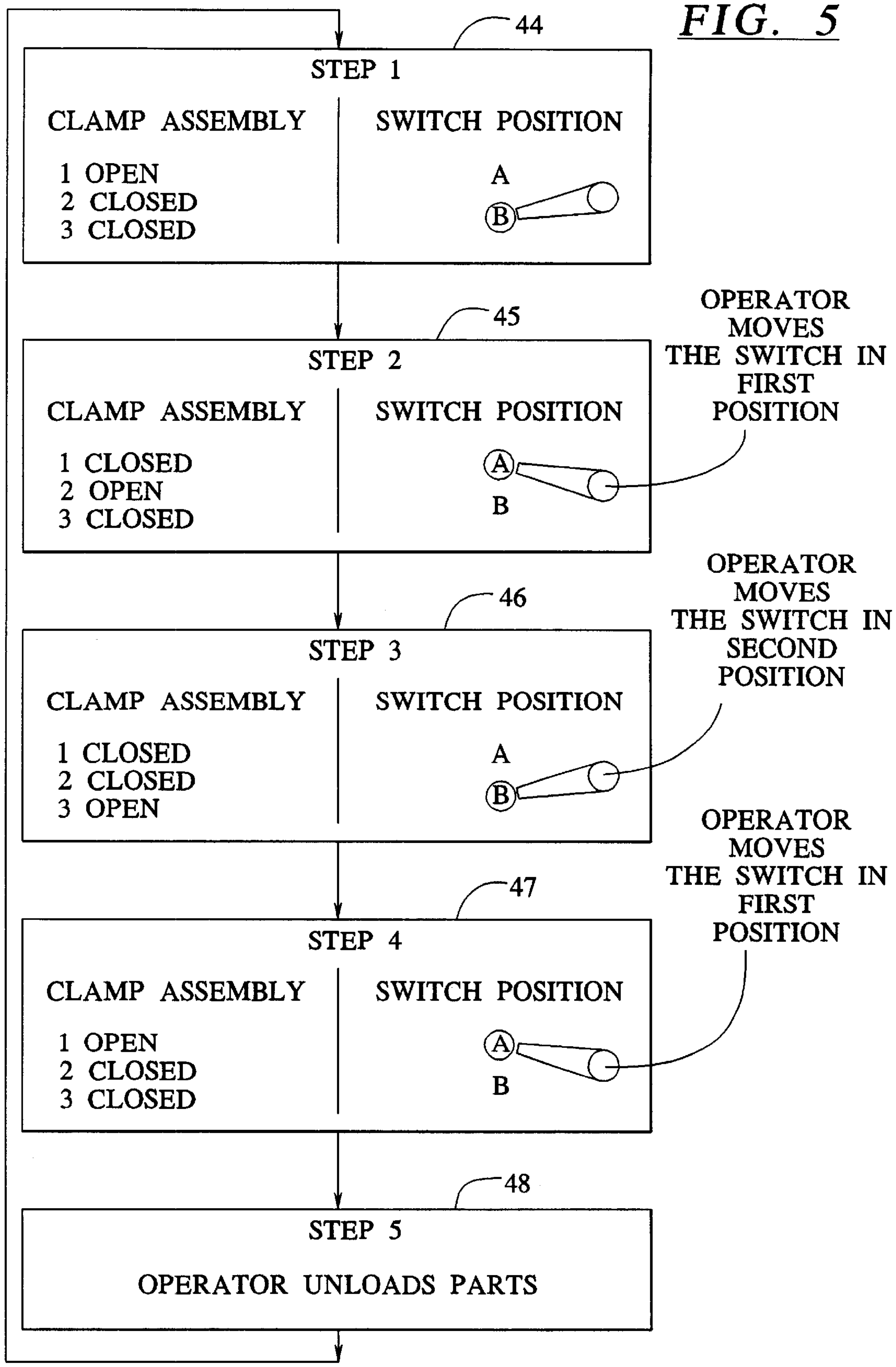
FIG. 5 is a flow chart illustrating steps employed in partial automatic operation of the device of FIG. 1.

As shown in FIG. 5, when operated in the partial automatic mode, the system operates according to five basic steps. As shown in FIG. 1, the operator controls a switch 49 and shuttles it back and forth between positions 49A and 49B. In step 1, (Box 4) with the switch 49 in position B, clamp assembly 1 is open and clamp assemblies 2 and 3 are closed. This is the situation shown in FIG. 1 and parts would therefore accumulate in front of clamp assembly 2. Thereafter, in step 2 (Box 45) the operator moves the switch 49 and to position A, for example (see FIG. 1—hereinafter known as the “first” position) which closes clamp assembly 1, opens clamp assembly 2, and keeps clamp assembly 3 closed. Therefore, the parts accumulated in front of clamp assembly 2 slide to a position in front of clamp assembly 3. Then in step 3 (Box 46) the operator moves switch 49 into the second position B. Clamp assembly 1 stays closed, clamp assembly 2 closes, and clamp assembly 3 opens. Thus, the parts which are accumulated in front of clamp assembly 3 move down to the curved arm 15*b* where the operator can unload them.

In step 4, (Box 47), the operator moves switch 49 back to position A which opens the first clamp assembly, maintains the second clamp assembly closed, and closes the third clamp assembly. This can be seen to be the same initial starting point as step 1. Thereafter, in step 5 (Box 48), the operator unloads the parts, and then repeats the procedure beginning at step 1.

Figure 6:
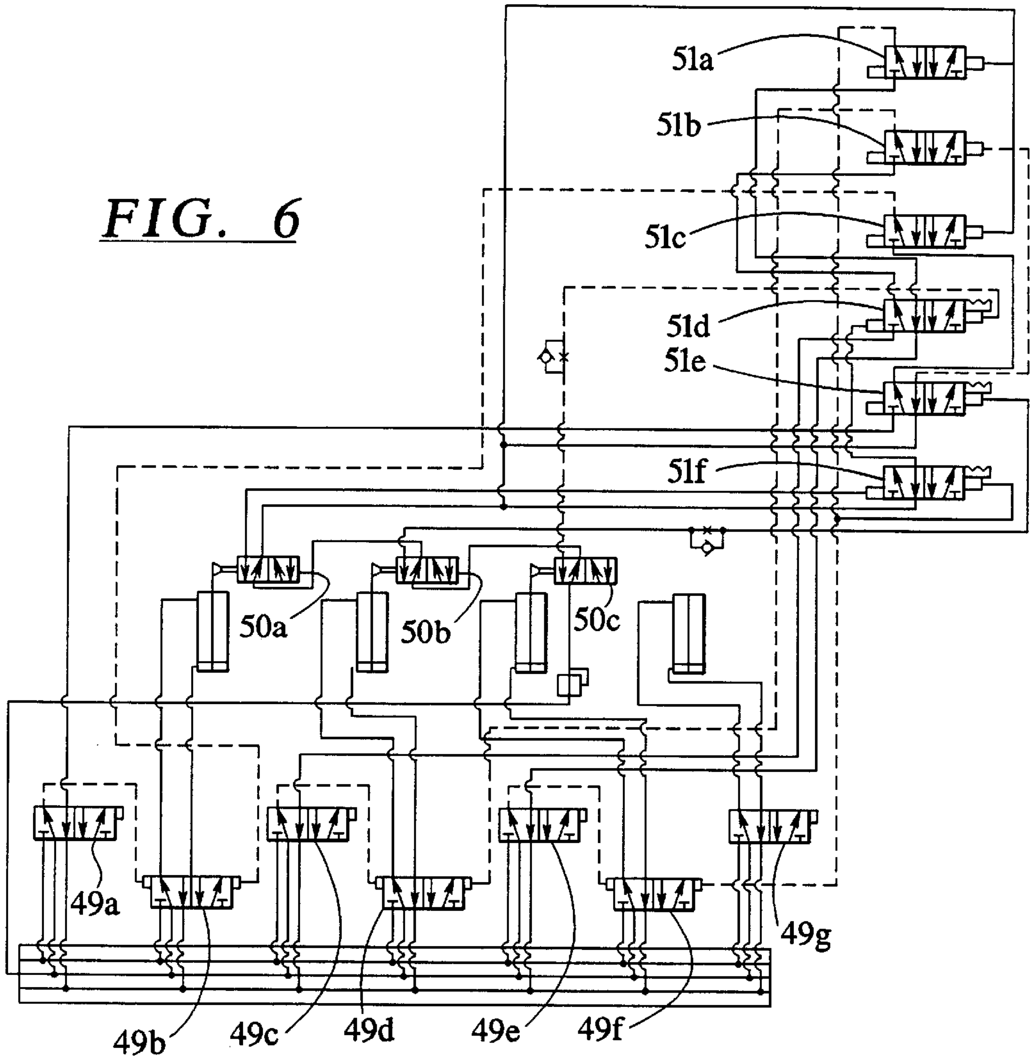
FIG. 6 is a schematic illustration of a valve control system for the partial automatic operation described in FIG. 5.

In this partially automatic mode described with respect to FIG. 5, a pneumatic control system may be employed as shown in FIG. 6 employing seven directional control valves 49*a*, 49*b*, 49*d*, 49*c*, 49*e*, 49*f* and 49*g*; three shuttle valves 50*a*, 50*b* and 50*c*; and six relay valves 51*a*, 51*b*, 51*c*, 51*d*, 51*e* and 51*f*.

Figure 7:
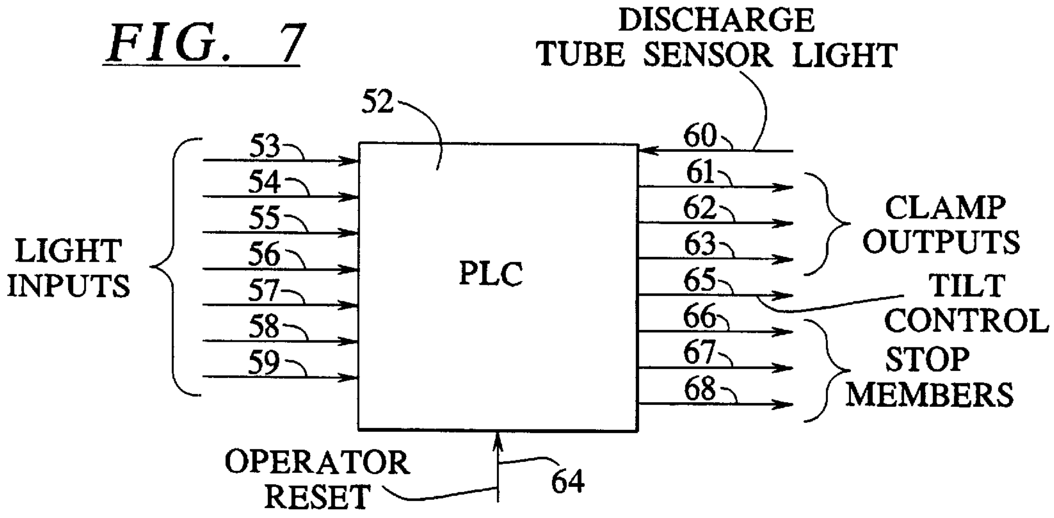
FIG. 7 is a schematic illustration of a fully automatic PLC system for operating the device of FIG. 1.

It is preferred that the system operate fully automatically. For full automatic operation, a programmable logic control PLC shown at 52 in FIG. 7 is employed. As inputs to the PLC, eight photo electronic sensors 53 through 60 are employed. As shown in FIG. 1 and FIG. 7, a sensing sensor 53 is monitoring when the stack of laminations 9 reaches a proper length. This then triggers closing of clamp assembly 17 and opening of the clamp assembly 18. Again, as shown in FIGS. 1 and 7, sensor pairs 54 and 55 are positioned just before and just after the first clamp assembly 17 and are employed to ensure that no laminations are present between the clamping arms when the clamping arms close. Similar sensor pairs 56/57 and 58/59 are provided for the second and third clamp assemblies 18 and 19. Also, an output 66 to the stop member 6 shown in FIG. 4A employed as a secondary protection in addition to the light sensors 54/55 to ensure that parts are not caught between the clamping arms when the clamp assembly closes. Similarly, stop member output signals 67 and 68 may be provided for secondary protection for the other two clamp assemblies 18 and 19. These stop member signals are actuated prior to when the clamping assembly signals are actuated. The PLC 52 also receives a signal from a sensor 60 which activates a discharge tube tilt control 5 with tilt control signal 65 explained hereafter. Outputs 61, 62 and 63 for the respective first, second and third clamp assemblies (that is for driving the cylinders thereof) are also provided. An operator reset input 64 is also provided.

The fully automatic system operates substantially the same as shown in the semi-automatic flow chart of FIG. 5 except that the operator movement of the switch 49 described for FIG. 5 is no longer necessary with the fully automatic system, and the tilt control function is added.

The-tilt control system is triggered by a light signal from light input 60 in order to cause a rotation of the end member 15*c* into a vertical down position in order to automatically off load the stack 20, such as into a box or onto a conveyor. The light sensor 60 detects when the stack 20 has reached a predetermined length for triggering the tilt mechanism 5.

Although various minor modifications might be suggested by those skilled in the art, it should be understood that our wish to embody within the scope of the patent warranted hereon all such modifications as reasonably and properly come with the scope of our contribution to the art.

We claim as our invention:

1. A parts handling system for off-loading and stacking parts having a central aperture being output from a stamping press, comprising:

a slide having a curved surface to be received through the aperture of the parts and extending in sloping fashion with its upper end being positioned at the press and its lower end at a location for unloading accumulated parts;

a frame having first, second, and third clamp assemblies mounted thereon said clamp assemblies being placed in close proximity to said slide;

first, second, and third mounting elements attached to and beneath said curved surface of said slide in spaced relationship from one another in alignment with the clamp assemblies and which are held by the clamp assemblies when the clamp assemblies are in a closed position such that when only two of the clamp assemblies are closed, the slide is supported in a sloped position; and a control system opening and closing the first, second and third clamp assemblies in a sequence that causes the parts to accumulate in front of either the first, second, or third clamp assemblies.

2. A system according to claim 1 wherein the control system is semiautomatic and has a lever switch actuated by an operator for shuttling between first and second positions for opening and closing certain of said clamp assemblies.

3. The system of claim 1 wherein the control system comprises a fully automatic logic control so that operator intervention is not required for opening and closing the individual clamp assemblies.

4. The system of claim 3 wherein an automatic tilt control is provided for off loading a stack at a lower end of the slide by tilting the portion of the slide automatically.

5. The system according to claim 1 wherein each of the mounting elements comprises spaced inserts with apertures therein and each of the clamp assemblies has pins received in said apertures.

6. The system according to claim 1 wherein each of the clamp assemblies has links arranged such that in a closed position a force is required to open arms of the assemblies as a result of one pivot point of the links being slightly out of line with two other pivot points of the links.

7. The system according to claim 1 wherein each clamp assembly has a reciprocating stop member to prevent parts from passing through the clamp member when the reciprocating stop member is in an up position.

8. The system according to claim 1 wherein a light sensor is provided before and after each clamp assembly.

9. The system according to claim 1 wherein a sensor light is provided in front of the second clamp assembly to determine when a stack of parts has reached a predetermined length when the second clamp assembly is closed.

10. The system according to claim 1 wherein the frame has caster jacks for mobility.

11. The system according to claim 10 wherein the frame has legs having a changeable length.

12. The system according to claim 1 wherein a slide plate is provided beneath the curved surface along the slide to improve parts alignment.

13. The system according to claim 1 wherein the slide has a laterally curving end portion for unloading parts.

14. A parts handling device for off-loading and stacking parts having a central aperture output from a parts manufacturing device, comprising:

a slide having a sliding surface to be received through the aperture of the parts and extending in sloping fashion with its upper end being positioned at the device and its lower end at an unloading location for accumulated stacked parts;

a frame having first, second, and third clamp assemblies mounted thereon said clamp assemblies being placed in close proximity to said slide; and first, second, and third mounting elements attached to and beneath said sliding surface of said slide in spaced relationship from one another in alignment with the clamp assemblies and which are held by the clamp assemblies when the clamp assemblies are in a closed position such that when only two of the clamp assemblies are closed, the slide is supported in a sloped position by the two clamp assemblies.

* * * * *